(12) United States Patent
Hosein et al.

(10) Patent No.: US 9,734,640 B2
(45) Date of Patent: Aug. 15, 2017

(54) METHOD AND SYSTEM OF BIDDING IN A VEHICLE

(71) Applicant: eBay Inc., San Jose, CA (US)

(72) Inventors: Marc Peter Hosein, Saratoga, CA (US); Steve Yankovich, San Jose, CA (US); Steve Romero, Portland, OR (US); Selina Lam, Castro Valley, CA (US); Krystal Rose Higgins, Campbell, CA (US)

(73) Assignee: eBay Inc., San Jose, CA (US)

( * ) Notice: Subject to any disclaimer, the term of this patent is extended or adjusted under 35 U.S.C. 154(b) by 771 days.

(21) Appl. No.: 13/961,359

(22) Filed: Aug. 7, 2013

(65) Prior Publication Data

US 2014/0052559 A1 Feb. 20, 2014

Related U.S. Application Data

(60) Provisional application No. 61/682,973, filed on Aug. 14, 2012.

(51) Int. Cl.
*G06Q 30/00* (2012.01)
*G07C 5/08* (2006.01)
(Continued)

(52) U.S. Cl.
CPC ........... *G07C 5/0808* (2013.01); *G01C 21/36* (2013.01); *G06F 17/30386* (2013.01); *G06F 17/30554* (2013.01); *G06F 17/30864* (2013.01); *G06F 17/30867* (2013.01); *G06Q 10/06* (2013.01); *G06Q 30/08* (2013.01); *G07C 5/006* (2013.01); *G07C 5/008* (2013.01); *H04W 88/02* (2013.01); *G07C 2205/02* (2013.01)

(58) Field of Classification Search
CPC .......... G06Q 30/08; G06Q 30/0601–30/0645; G06Q 10/06; G07C 5/0808; G07C 5/006; G07C 5/008; G01C 21/36; H04W 88/02
USPC ....................... 705/26.1–27.2, 26.3
See application file for complete search history.

(56) References Cited

U.S. PATENT DOCUMENTS

2002/0023039 A1* 2/2002 Fritsch ................ G06F 3/04847
705/37
2004/0039677 A1 2/2004 Mura et al.
(Continued)

FOREIGN PATENT DOCUMENTS

WO WO-2014028464 A1 2/2014

OTHER PUBLICATIONS

"6 Mobile Applications to Prevent Distracted Driving Accidents." Lyden, Sean. Aug. 2011. www.automotive-fleet.com.*
(Continued)

*Primary Examiner* — Michael Misiaszek
*Assistant Examiner* — Katherine O'Sullivan
(74) *Attorney, Agent, or Firm* — Schwegman Lundberg & Woessner, P.A.

(57) ABSTRACT

A method of dynamically altering a user interface based on safety level is provided. A user interface is provided to a user in a vehicle with the user interface including a selectable option to wirelessly place a bid on an electronic auction. The selectable option is based, at least in part, on an auction parameter. A safety level score is then determined for the vehicle. The auction parameter is then dynamically altered based on the speed of the vehicle, resulting in a change to the selectable option.

19 Claims, 9 Drawing Sheets

(51) Int. Cl.
G07C 5/00 (2006.01)
G06Q 30/08 (2012.01)
G06F 17/30 (2006.01)
G06Q 10/06 (2012.01)
G01C 21/36 (2006.01)
H04W 88/02 (2009.01)

(56) References Cited

U.S. PATENT DOCUMENTS

| | | | |
|---|---|---|---|
| 2008/0129684 A1* | 6/2008 | Adams | B60K 35/00 |
| | | | 345/156 |
| 2009/0064169 A1 | 3/2009 | Nguyen et al. | |
| 2010/0280956 A1* | 11/2010 | Chutorash | G06Q 20/20 |
| | | | 705/64 |
| 2011/0213628 A1 | 9/2011 | Peak et al. | |
| 2011/0288724 A1 | 11/2011 | Falk | |
| 2011/0294520 A1* | 12/2011 | Zhou | H04W 48/04 |
| | | | 455/456.1 |

OTHER PUBLICATIONS

"International Application Serial No. PCT/US2013/054693, International Preliminary Report on Patentability mailed Feb. 26, 2015", 8 pgs.
"International Application Serial No. PCT/US2013/054693, International Search Report mailed Jan. 10, 2014", 3 pgs.
"International Application Serial No. PCT/US2013/054693, Written Opinion mailed Jan. 10, 2014", 6 pgs.

* cited by examiner

| Score Threshold | Bid increment |
|---|---|
| 0 | $100 |
| 20 | $50 |
| 40 | $25 |
| 60 | $10 |
| 80 | $5 |

METHOD AND SYSTEM OF BIDDING IN A VEHICLE

PRIORITY

This patent application claims the benefit of priority, to U.S. Provisional Patent Application Ser. No. 61/682,973, filed on Aug. 14, 2012, which is hereby incorporated by reference herein in its entirety. motion, the element is disabled.

BACKGROUND

Recently, it has been more common for users to utilize electronic devices in moving vehicles as in, for example, automobiles. The user interface may be displayed on an in-dash computer screen or may be located on a smartphone, which may be carried or may be physically mounted on a dashboard of the vehicle, for example. For the most part, the user experience with these in-vehicle electronic devices is somewhat static in nature. The user interface (UI) screens displayed are the same no matter the state of the vehicle. Some automobiles automatically deactivate particular element of such UIs while the vehicle is in motion and only allow the element to be activated when the vehicle is stopped and in "park," thus the decision is simply "on/off: if the car is in motion, the element is disabled

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Although the present embodiments have been described with reference to specific example embodiments, it will be evident that various modifications and changes may be made to these embodiments without departing from the broader spirit and scope of the embodiments. Accordingly, the specification and drawings are to be regarded in an illustrative rather than a restrictive sense.

In an example embodiment, rules for an electronic auction may be dynamically modified based on the degree of motion (e.g., speed) of a vehicle or device utilized by a bidder. In an example embodiment, a bid increment for the electronic auction may be dynamically modified based on speed.

Figure 1:
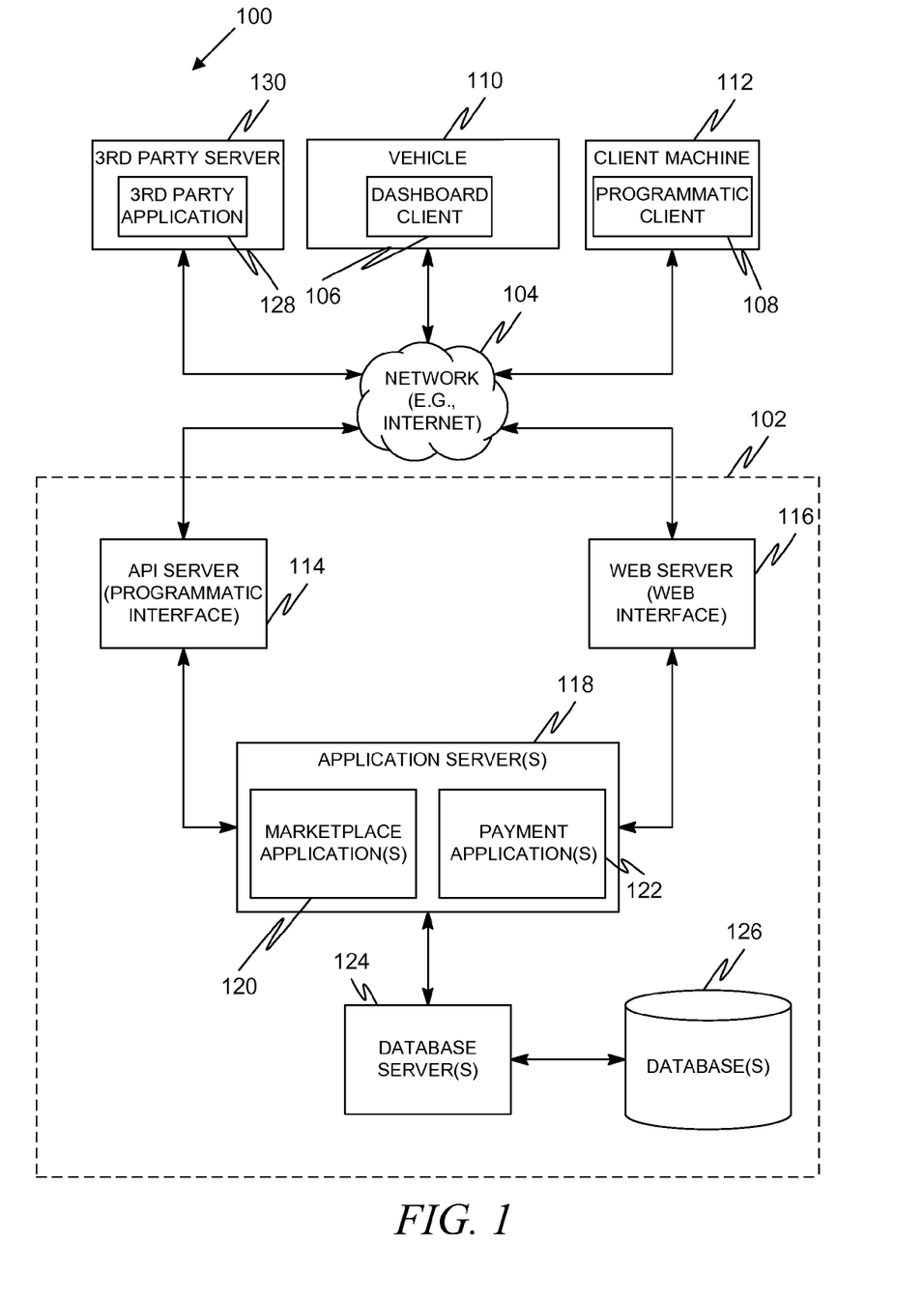
FIG. 1 is a network diagram depicting a client-server system within which one example embodiment may be deployed.

FIG. 1 is a network diagram depicting a client-server system 100, within which one example embodiment may be deployed. A networked system 102, in the example form of a network-based marketplace or publication system, provides server-side functionality, via a network 104 (e.g., the Internet or Wide Area Network (WAN)) to one or more clients. FIG. 1 illustrates, for example, a dashboard client 106 (e.g., software running in a dashboard) and a programmatic client 108 executing on respective machines, namely vehicle 110 and client machine 112.

An Application Program Interface (API) server 114 and a web server 116 are coupled to and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may, likewise, provide a number of payment services and functions to users. The payment applications 122 may allow users to accumulate value (e.g., in a commercial currency, such as the U.S. dollar or a proprietary currency, such as "points") in accounts and to redeem the accumulated value for products (e.g., goods or services) that are made available via the marketplace applications 120 at a later time. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the client server system 100 shown in FIG. 1 employs a client-server architecture, the present disclosure is, of course, not limited to such an architecture and could equally well find application in a distributed or peer-to-peer architecture system, for example. The various marketplace and payment applications 120 and 122 could also be implemented as standalone software programs, which do not necessarily have networking capabilities.

The dashboard client 106 accesses the various marketplace and payment applications 120 and 122 via a web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) that enables sellers to author and manage listings on the networked system 102 in an off-line manner and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Electronic auctions, such as auctions conducted online via online auction sites such as eBay™, have various auction parameters. Certain parameters, such as auction complete time, minimum price, etc., are sometimes set by the seller. Other parameters, such as minimum bid increment, are often set by the system. However, all of these parameters are fixed when the auction begins and remain static throughout the course of the auction. In the case of minimum bid increments, the bid increment will sometimes change during the course of the auction but only in a fixed pattern. For example, an auction may have a minimum bid increment of $0.05 until the bid reaches $1, then have a minimum bid increment of $0.10 until the bid reaches $5, then have a minimum bid increment of $0.25 until the bid reaches $10, and so on. Despite the minimum bid increment changing during the course of the auction, it does so in a fixed, predictable pattern and does not change dynamically based on some run-time condition.

In an example embodiment, auction parameters are dynamically altered during the auction based on motion of a device where a bid is being placed. Specifically, for an embodiment where the device is part of or located inside a vehicle, auction parameters are dynamically altered based on the speed of the device (and ultimately, the vehicle).

When dealing with user interfaces presented in moving vehicles, safety becomes a big factor. Oftentimes, it is a driver of a vehicle who is interacting with the user interface. As the speed of the vehicle increases, the danger of losing attention on driving while interacting with the user interface increases. Recognizing this fact, in an example embodiment, the system attempts to minimize the amount of user interaction required to place bids. One way in which the user interaction can be reduced is by decreasing the number of bids necessary to be entered. Oftentimes, a user will enter into a competitive bidding process during an auction: the user will enter one bid only to be outbid by an amount equal to the minimum bid increment, and then renter another bid higher than the current bid by the minimum bid increment. This process can repeat innumerable times until the auction is completed. In an example embodiment, the minimum bid increment increases as the speed of the vehicle in which the user interface is being run increases. By increasing the minimum bid increment, the number of times the user will likely have to rebid is reduced and, thus, makes being outbid less likely.

Figure 2:
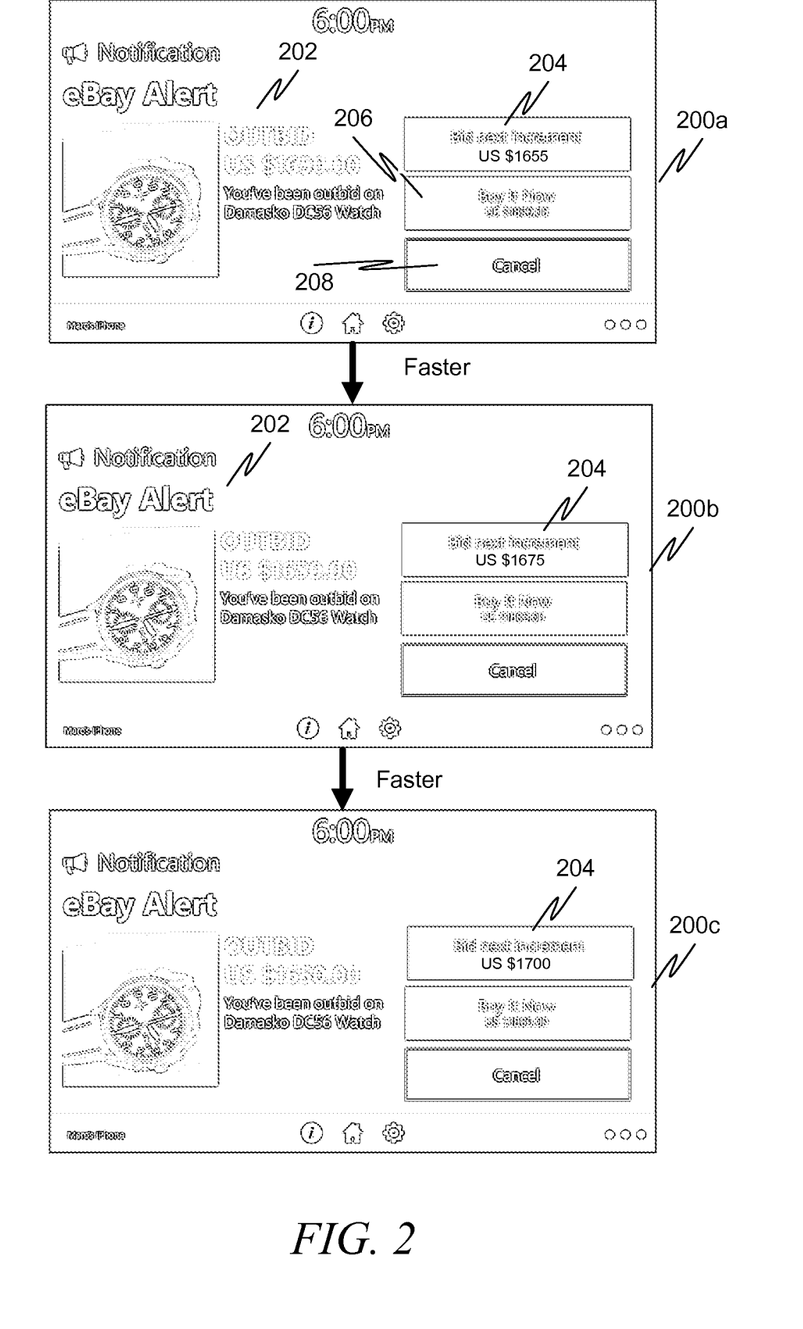
FIG. 2 is a diagram illustrating a progression in accordance with an example embodiment, of dynamic alteration of a user interface based on a calculated safety level.

FIG. 2 is a diagram illustrating a progression of dynamic alteration of a user experience, in accordance with another example embodiment. Depicted are three states of a user interface 200*a*, 200*b*, and 200*c*, displaying an auction notification. The user has bid and has, subsequently, been outbid on an online auction. As such, the system is attempting to notify the user that he/she has been outbid to see if he/she wishes to rebid and in what amount. User interface 200*a* includes a notification 202, a bid next increment button 204 which allows the user to automatically make a bid one increment higher than the highest bid, a buy it now button 206 which allows the user to simply end the auction by purchasing the item at a pre-set price, and a cancel button 208 which allows the user to do nothing but dismiss the notification 202. The user interface 200*a* may be displayed when it is deemed safe enough for the user to do so, based on the various factors described earlier.

As the user drives the vehicle, the device may ultimately be deemed to be in a "less safe" state: the vehicle is moving faster than before, but still at a slow speed. In such an instance, a transition may be made to user interface 200*b* where the bid next increment button 204 now reflects a bid increment of $25 instead of $5.

As the user continues to speeds up, a transition may be made to user interface 200*c*, wherein the bid net increment button 204 now reflects a bid increment of $50 instead of $25.

The modifications to the user experience may not solely be based on speed. Indeed, various information related to the safety level of the vehicle may be utilized in order to determine how to dynamically modify one or more parameters of the electronic auction.

Figure 3:
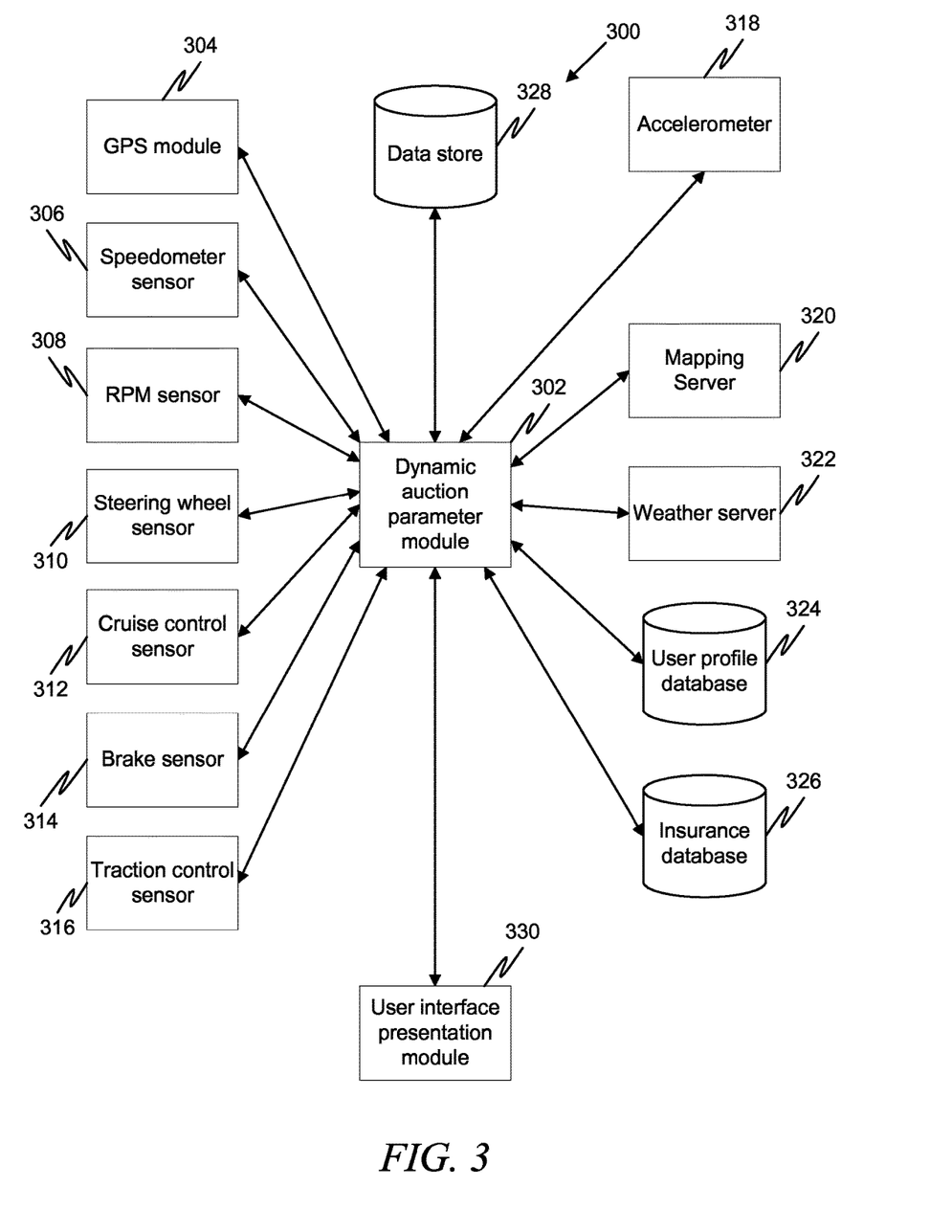
FIG. 3 is a diagram illustrating a system, in accordance with an example embodiment.

FIG. 3 is a diagram illustrating a system, in accordance with an example embodiment. The system 300 may include a dynamic auction parameter module 302. Coupled to the dynamic auction parameter module 302 may be various information sources and/or sensors 304-326 from which the dynamic auction parameter module 302 may gather information related to the current safety level of a vehicle. These various information sources and/or sensors 304-326 may be located in a vehicle, in a mobile device travelling in the vehicle, or outside the vehicle. Presented here are a number of examples of these information sources and/or sensors 304-326, but the disclosure is not limited to the examples provided. Additionally, not all embodiments will contain each of these information sources and/or sensors 304-326 and, in fact, some embodiments may rely on a single information source and/or sensor 304-326 (such as, for example, one that provides speed information). Indeed, certain types of information may be gathered from various alternative mechanisms. As an example, speed information could be gathered from examining a GPS module 304 over time and calculating the change in distance over that time. Alternatively, speed information could be gathered directly from a speedometer sensor 306. Other possible sensors that might be commonly located within the vehicle may be an RPM sensor 308 which could be used to generally gauge acceleration, a steering wheel sensor 310 which could be used to gauge how much the vehicle is moving laterally, a cruise control sensor 312 which may be used to gauge whether cruise control is engaged (which typically would imply a safer environment), a brake sensor 314 which may be used to gauge whether the vehicle is currently braking, and a traction control sensor 316 which may be used to gauge whether traction control is currently engaged (which typically would imply a less safe environment).

An accelerometer 318, such as those commonly found in smartphones, could also be accessed.

Also presented are information sources 320-326 that may commonly be located outside of the vehicle, such as a mapping server 320 which may be used to determine how safe the current physical location is (e.g., a curvy mountain road may be less safe than a straight desert highway), a weather server 322 which may be used to determine local weather conditions (e.g., is the vehicle located in a storm front), a user profile database 324 which may store demographic information about the user (e.g., a driver), such as age, which could be useful in determining the relative safety level (e.g., a 16 year old driver or an 85 year old driver may require a "safer" user experience than a 40 year old driver), and an insurance database 326 which may contain information from an insurer of the vehicle, such as a safety record of the driver.

The dynamic auction parameter module 302 may be located in the vehicle, on a mobile device, or on a separate server, such as a web server. The dynamic auction parameter module 302 may act to calculate a score identifying the relative safety level of the vehicle based on one or more of the factors described above. This score may be compared with a series of thresholds to determine which of a number of different possible auction parameter modifications should be made. The thresholds may be stored in a table maintained in a data store 328.

A user interface presentation module 330 may receive the instructions for the updated user interface from the dynamic auction parameter module 302 and update the user interface accordingly. This update may take a number of forms, including the modification of a web page to be displayed in a browser, or the modification of visual or audio elements of an application user interface running in the vehicle.

Figure 4:
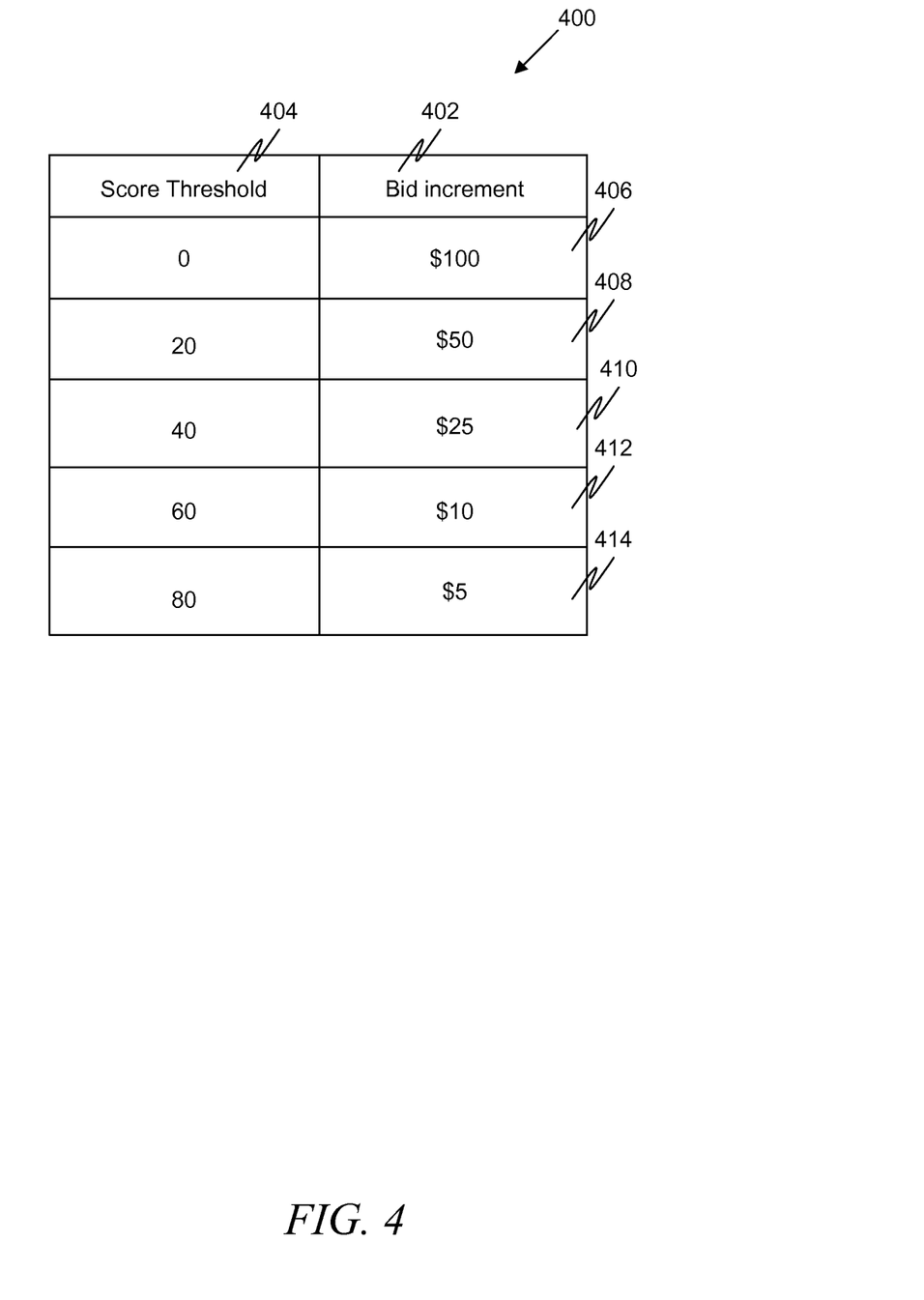
FIG. 4 is a diagram illustrating a table of auction parameter alterations based on safety level score, in accordance with an example embodiment.

FIG. 4 is a diagram illustrating a table of dynamic auction parameter adjustments, in accordance with an example embodiment. The table 400 includes an identification of value for an auction parameter in one column 402 and a score threshold in another column 404. As an example, the dynamic auction parameter module 302 may calculate a safety level score on a scale of 0-100. The table 400, therefore, identifies six different values for auction parameters 406-414 each of which is used if the score is between the identified threshold and the next threshold. If the dynamic auction parameter module 302 calculated a current safety level score of 56, then value 410 (correlating to a bid increment of $25) would be utilized. If the situation changes to a less safe situation and the safety level score drops to 35, the table indicates that the bid increment should be changed to a user experience value 408 (correlating to a bid increment of $50).

It should be noted that the above example provides fixed values for each safety level. However, there may be certain auction parameters where fixed values may not be appropriate in all circumstances. For bid increment, for example, the increment may be somewhat based on the current bid amount. As such, the table 400 may express different parameter values in terms of percentage or incremental variations on a default bid increment. For example, when the value of an auction is at $1, the default bid increment may be $0.05. The default bid increment may be used for the value at the highest category of the safety score. As such, values for subsequent categories of safety score may be represented as a percentage of that default bid increment (e.g, 2× default bid increment, 3× default bid increment, etc.)

Alternatively, bid increments may increase incrementally. For example, the system may already be designed with the knowledge that bid increments typically are one value up to a certain current bid amount, and then a different value up to another current bid amount, and so on. For example, default bid amounts may be $0.05, $0.10, $0.25, $0.50, $1, $2, $5, $10, $25, and $50, depending on current bid amount (increasing incrementally). In an example embodiment, as speed (or other safety factors) makes the vehicle more dangerous, the bid increment increases from the default bid increment for the current bid amount (say, e.g., $1 on a $100 item) to the next highest bid increment for the system (say, e.g., $2, which would ordinarily only be in force for a $200 item. However, since the safety of the vehicle in this example is compromised, it would be used for the $100 item).

It should be noted that while the above describes a single current safety level score based on one or more factors affecting the current safety level, the system could also be "forward-thinking" and calculate potential future changes to the current safety level and utilize such potential future changes in determining how to dynamically alter the user experience. This may involve, for example, calculating potential future safety level scores or weighting (e.g., discounting or increasing) the current safety level score based on the future projections. For example, the system may determine that the current safety level score is a relatively safe 78; however, due to increased traffic ahead on the vehicle's route and projected weather information, the safety level may drop dramatically within a short time frame (e.g., within 5 minutes). As such, the relatively safe 78 score may be discounted so that the user experience presented is one that is designed for a less safe environment than if the 78 score were anticipated to continue for an extended period of time.

Figure 5:
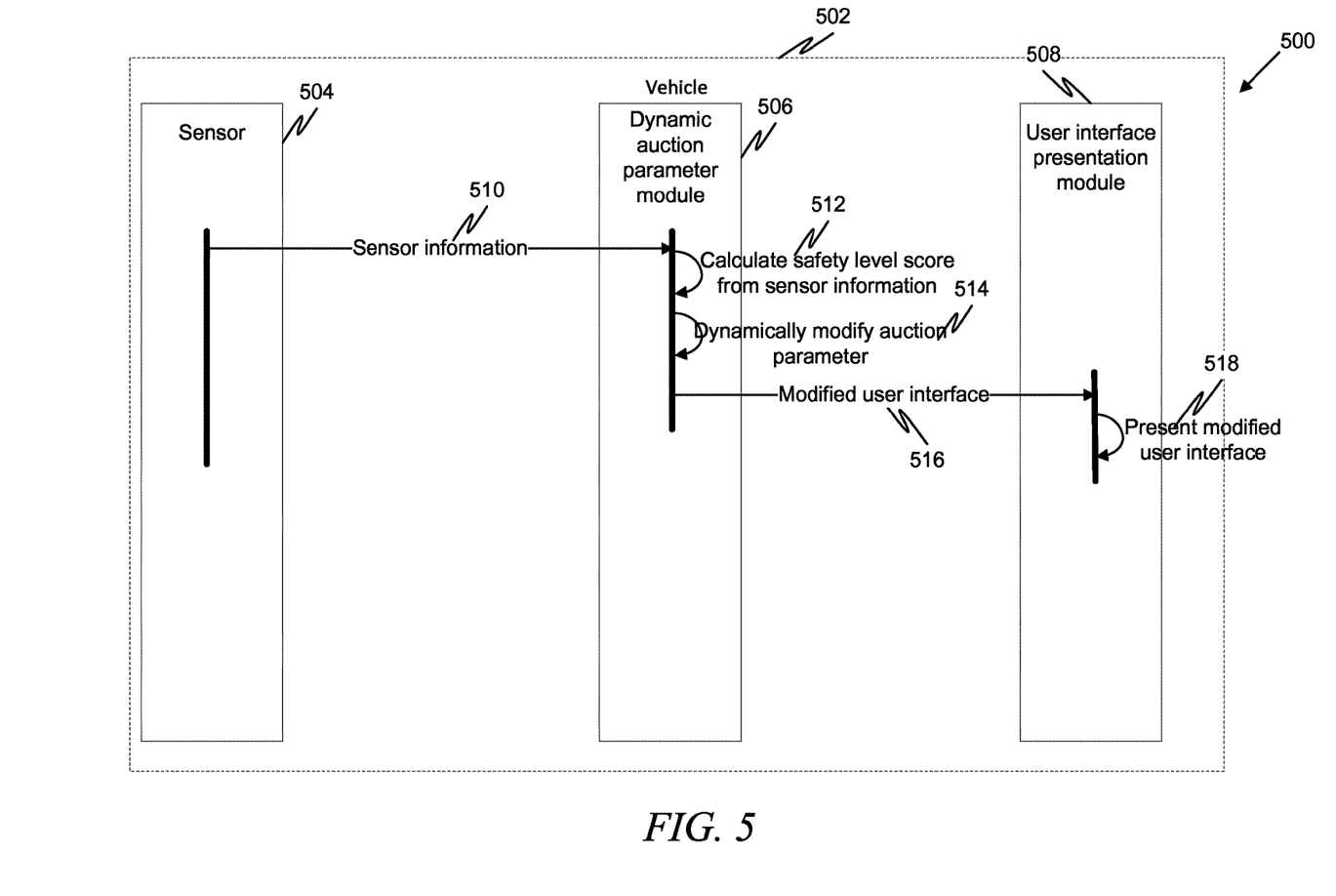
FIG. 5 is an interaction diagram illustrating a method, in accordance with an example embodiment, of dynamically altering a user interface.

FIG. 5 is an interaction diagram illustrating a method 500, in accordance with an example embodiment, of dynamically altering a user interface. In this method 500, a vehicle 502 may contain a sensor 504, a dynamic auction parameter module 506, and a user interface presentation module 508. At operation 510, the sensor 504 sends sensor information to the dynamic auction parameter module 506. At operation 512, a safety level score is calculated from sensor information. At operation 514, an auction parameter is dynamically modified based on the safety level score, thus changing a selectable option related to the auction in a user interface. At operation 516, the dynamic auction parameter module 506 sends the modified user interface to the user interface presentation module 508, which at operation 518 presents the modified user interface.

Figure 6:
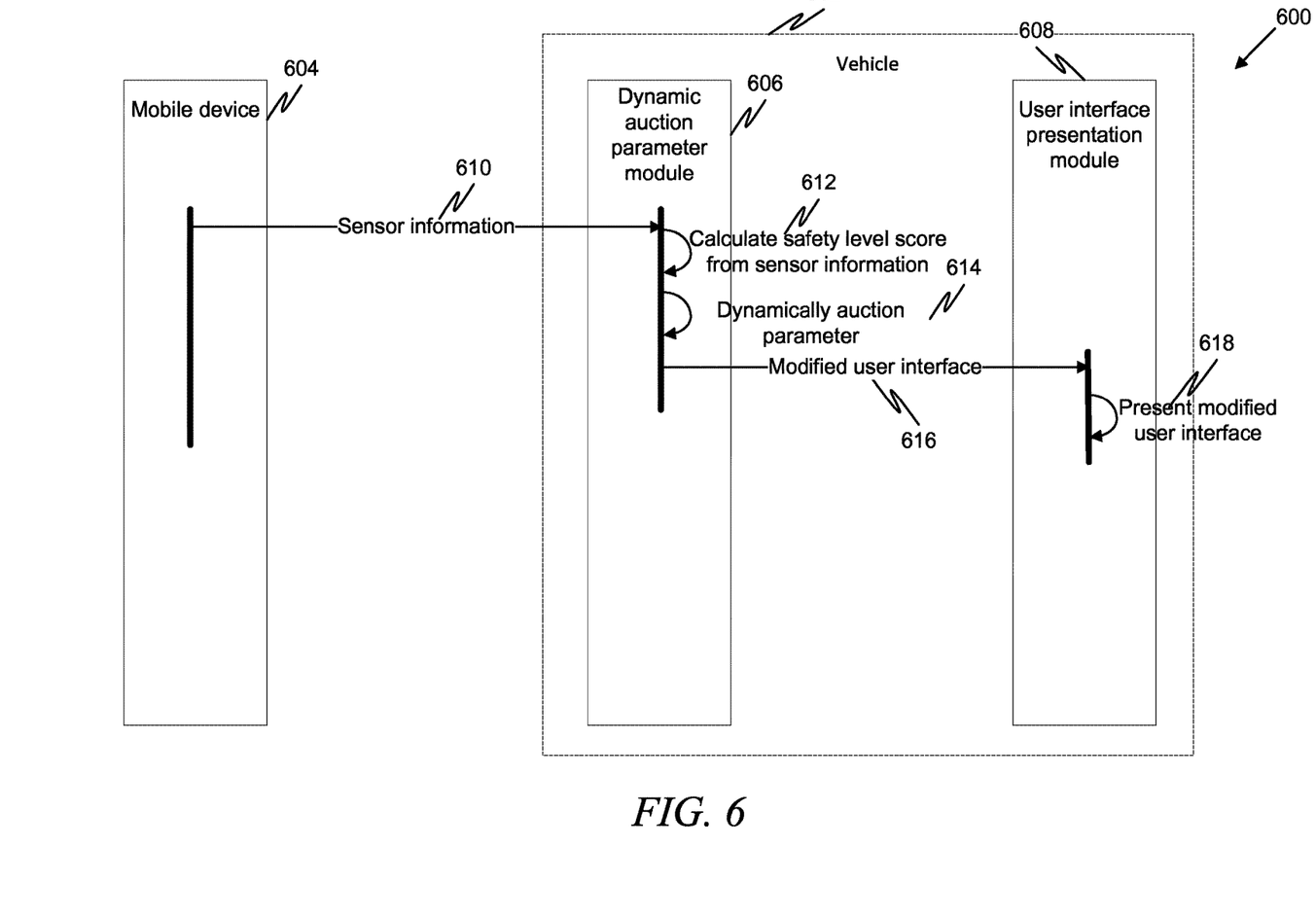
FIG. 6 is an interaction diagram illustrating a method, in accordance with another example embodiment, of dynamically altering a user interface.

FIG. 6 is an interaction diagram illustrating a method 600, in accordance with another example embodiment, of dynamically altering a user interface. In this method 600, a mobile device 604, such as a smartphone, may contain a sensor separate from a vehicle 602 itself, which contains a dynamic auction parameter module 606 and a user interface presentation module 608. At operation 610, the mobile device 604 sends sensor information to the dynamic auction parameter module 606. At operation 612, a safety level score is calculated from sensor information. At operation 614, an auction parameter is dynamically modified based on the safety level score which alters a selectable option in a user interface. At operation 616, the dynamic auction parameter module 606 sends the modified user interface to the user interface presentation module 608, which at operation 618 presents the modified user interface.

Figure 7:
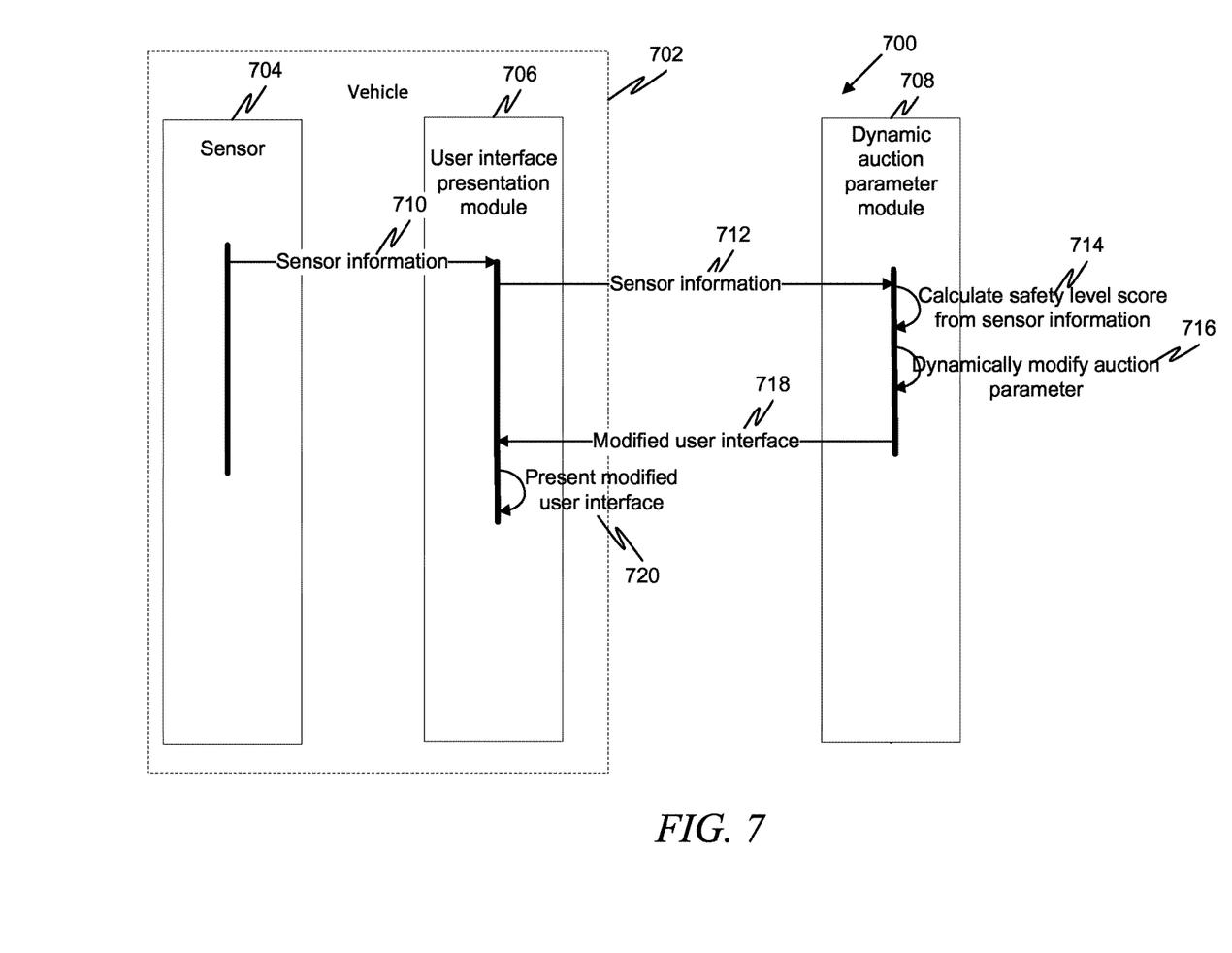
FIG. 7 is an interaction diagram illustrating a method, in accordance with another example embodiment, of dynamically altering a user interface.

FIG. 7 is an interaction diagram illustrating a method 700, in accordance with another example embodiment, of dynamically altering a user interface. In this method 700, a vehicle 702 may contain a sensor 704 and a user interface presentation module 706. A dynamic auction parameter module 708 may be located elsewhere, such as on a server. At operation 710, the sensor 704 may send sensor information to the user interface presentation module 706, which at operation 712 may communicate the sensor information to the dynamic auction parameter module 708. This may be communicated by, for example, a wireless communications standard such as 3G, 4G, LTE, Wi-Fi, or any other wireless communication standard. At operation 714, a safety level score is calculated from sensor information. At operation 716, an auction parameter is dynamically modified based on the safety level score, thus changing a selectable option in a user interface. At operation 718, the dynamic auction parameter module 708 sends the modified user interface to the user interface presentation module 706, which at operation 720 presents the modified user interface.

Figure 8:
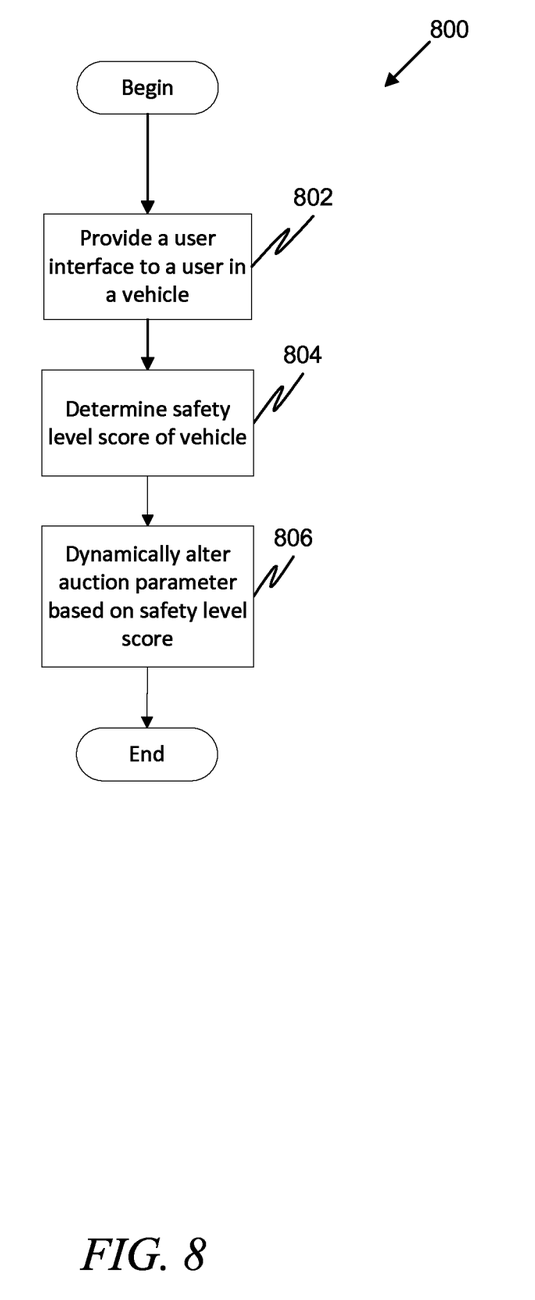
FIG. 8 is a flow diagram illustrating a method of dynamically altering a user interface, in accordance with an example embodiment.

FIG. 8 is a flow diagram illustrating a method 800, in accordance with an example embodiment, of dynamically altering a user interface. At operation 802, a user interface is provided to a user in a vehicle. The user interface includes a selectable option (the selectable option is based in part on an auction parameter) to wirelessly place a bid on an electronic auction. At operation 804, a safety level score for the vehicle is determined. At operation 806, the auction parameter is dynamically altered based on the safety level score resulting in a change to the selectable option.

Figure 9:
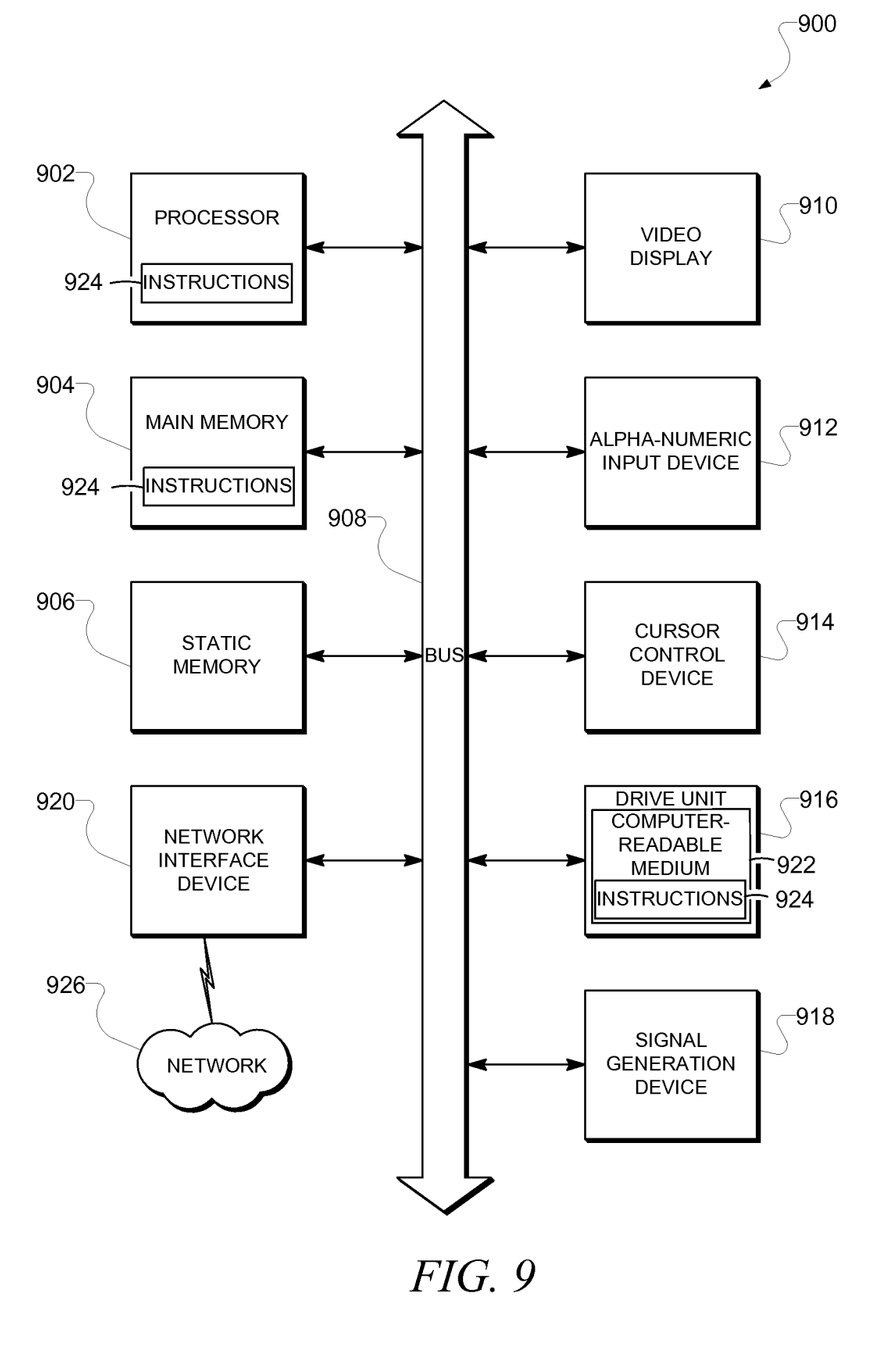
FIG. 9 shows a diagrammatic representation of a machine in the example form of a computer system within which a set of instructions for causing the machine to perform any one or more of the methodologies discussed herein may be executed.

FIG. 9 shows a diagrammatic representation of a machine in the example form of a computer system within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a drive unit 916, a signal generation device 918 (e.g., a speaker), and a network interface device 920.

The drive unit 916 includes a computer-readable medium 922 on which is stored one or more sets of instructions 924 (e.g., software) embodying any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media. The instructions 924 may be further transmitted or received over a network 926 via the network interface device 920.

While the computer-readable medium 922 is shown in an example embodiment to be a single medium, the term "computer-readable medium" should be taken to include a single medium or multiple media (e.g., a centralized or distributed database, and/or associated caches and servers) that store the one or more sets of instructions 924. The term "computer-readable medium" shall also be taken to include any medium that is capable of storing, encoding or carrying a set of instructions for execution by the machine and that cause the machine to perform any one or more of the methodologies described herein. The term "computer-readable medium" shall accordingly be taken to include, but not be limited to, solid-state memories, optical and magnetic media, and carrier wave signals.

Although the inventive concepts have been described with reference to specific example embodiments, it will be evident that various modifications and changes may be made to these embodiments without departing from the broader spirit and scope of the inventive concepts. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. An electronic device, comprising:
   a processor;
   a user interface coupled to the processor; and
   memory coupled to the processor and storing instructions that, when executed by the processor, cause the electronic device to:
   receive, over a wireless connection to the Internet, an auction notification for an online auction;
   display, via the user interface to a user of a vehicle, the auction notification for the online auction that includes a selectable option to place a bid on the online auction over the wireless connection to the Internet, wherein the selectable option includes a bid increment for the online auction;
   receiving, over a wireless communication connection, speed information received from a speedometer sensor coupled to the vehicle;
   determine, based on the received speed information, a speed of the vehicle;
   dynamically alter the bid increment based on the speed of the vehicle, wherein dynamically altering the bid increment includes one or more of: increasing the bid increment in response to the speed of the vehicle increasing, and decreasing the bid increment in response to the speed of the vehicle decreasing; and
   display, via the user interface, a revised selectable option to place a bid on the online auction over the wireless connection to the Internet, the revised selectable option including the altered bid increment.

2. The electronic device of claim 1, wherein the electronic device is located in the vehicle.

3. The electronic device of claim 1, wherein the electronic device is a mobile device travelling in the vehicle.

4. The electronic device of claim 1, wherein the electronic device is a server in wireless communication with a user experience presentation module in the vehicle.

5. The electronic device of claim 1, wherein the memory further stores instructions to cause the electronic device to determine a safety level score based on the speed of the vehicle and wherein dynamically altering the bid increment is further based on the safety level score.

6. The electronic device of claim 5, wherein the safety level score is further based on weather at a location of the vehicle.

7. The electronic device of claim 5, wherein the safety level score is further based on demographic information about a driver of the vehicle.

8. The electronic device of claim 5, wherein the safety level score is further based on a driving safety record of the driver of the vehicle.

9. A method comprising:
receiving, by an electronic device over a wireless connection to the Internet, an auction notification for an online auction;
displaying, via a user interface coupled to the electronic device, the auction notification for the online auction that includes a selectable option to place a bid on the online auction over the wireless connection to the Internet, wherein the selectable option includes a bid increment for the online auction;
receiving, over a wireless communication connection, speed information received from a speedometer sensor coupled to the vehicle;
determining, based on the received speed information, a speed of the vehicle;
dynamically altering the bid increment based on the speed of the vehicle by the electronic device, wherein dynamically altering the bid increment includes one or more of: increasing the bid increment in response to the speed of the vehicle increasing, and decreasing the bid increment in response to the speed of the vehicle decreasing; and
displaying, via the user interface, a revised selectable option to place a bid on the online auction over the wireless connection to the Internet, the revised selectable option including the altered bid increment.

10. The method of claim 9, further comprising determining a safety level score based on the speed of the vehicle and wherein dynamically altering the bid increment is further based on the safety level score.

11. The method of claim 9, wherein the electronic device comprises a server in wireless communication with the vehicle.

12. The method of claim 9, wherein the electronic device is located in the vehicle.

13. A non-transitory computer-readable storage medium comprising instructors that, when executed by an electronic device, cause the electronic device to perform operations comprising:
receiving, over a wireless connection to the Internet, an auction notification for an online auction;
displaying, via a user interface coupled to the electronic device, the auction notification for the online auction that includes a selectable option to place a bid on the online auction over the wireless connection to the Internet, wherein the selectable option includes a bid increment for the online auction;
receiving, over a wireless communication connection, speed information received from a speedometer sensor coupled to the vehicle;
determining, based on the received speed information, a speed of the vehicle;
dynamically altering the bid increment based on the speed of the vehicle, wherein dynamically altering the bid increment includes one or more of: increasing the bid increment in response to the speed of the vehicle increasing, and decreasing the bid increment in response to the speed of the vehicle decreasing; and
displaying, via the user interface, a revised selectable option to place a bid on the online auction over the wireless connection to the Internet, the revised selectable option including the altered bid increment.

14. The non-transitory computer-readable storage medium of claim 13, wherein the operations further comprise determining a safety level score based on the speed of the vehicle and wherein dynamically altering the bid increment is further based on the safety level score.

15. The non-transitory computer-readable storage medium of claim 13, wherein the electronic device comprises a server in wireless communication with the vehicle.

16. The non-transitory computer-readable storage medium of claim 13, wherein the electronic device is located in the vehicle.

17. The system of claim 1, wherein dynamically altering the bid increment includes increasing the bid increment in response to an increase in the speed of the vehicle.

18. The method of claim 9, wherein dynamically altering the bid increment includes increasing the bid increment in response to an increase in the speed of the vehicle.

19. The non-transitory computer-readable storage medium of claim 13, wherein dynamically altering the bid increment includes increasing the bid increment in response to an increase in the speed of the vehicle.

* * * * *

UNITED STATES PATENT AND TRADEMARK OFFICE
CERTIFICATE OF CORRECTION

PATENT NO. : 9,734,640 B2
APPLICATION NO. : 13/961359
DATED : August 15, 2017
INVENTOR(S) : Marc Peter Hosein et al.

It is certified that error appears in the above-identified patent and that said Letters Patent is hereby corrected as shown below:

In the Specification

In Column 1, Lines 9-10, after "entirety." delete "motion, the element is disabled.".

In the Claims

In Column 10, Line 4, in Claim 13, delete "instructors" and insert -- instructions --, therefor.

In Column 10, Line 41, in Claim 17, delete "system" and insert -- electronic device --, therefor.

Signed and Sealed this
Thirteenth Day of November, 2018

Andrei Iancu
*Director of the United States Patent and Trademark Office*